United States Patent
McKnight et al.

(10) Patent No.: US 10,766,411 B1
(45) Date of Patent: Sep. 8, 2020

(54) COLLISION AVOIDANCE ACTIVATION LIGHTS

(71) Applicant: Caterpillar Inc., Deerfield, IL (US)

(72) Inventors: James McKnight, Champaign, IL (US); David Bumpus, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/436,434

(22) Filed: Jun. 10, 2019

(51) Int. Cl.
| | |
|---|---|
| *B60Q 1/00* | (2006.01) |
| *B60Q 1/52* | (2006.01) |
| *B60W 30/095* | (2012.01) |
| *B60Q 1/44* | (2006.01) |
| *B60Q 1/46* | (2006.01) |

(52) U.S. Cl.
CPC .............. *B60Q 1/525* (2013.01); *B60Q 1/44* (2013.01); *B60Q 1/46* (2013.01); *B60W 30/0956* (2013.01)

(58) Field of Classification Search
CPC ........... B60Q 1/525; B60Q 1/44; B60Q 1/46; B60W 30/0956
See application file for complete search history.

(56) References Cited

U.S. PATENT DOCUMENTS

| | | | | |
|---|---|---|---|---|
| 3,925,759 | A * | 12/1975 | Lucas | B60Q 1/46 340/471 |
| 4,667,177 | A | 5/1987 | Athalye | |
| 8,125,327 | B2 | 2/2012 | Ognibene | |
| 10,059,261 | B2 * | 8/2018 | Wu | B60R 21/0134 |
| 10,086,833 | B1 * | 10/2018 | Duan | B60W 50/14 |
| 2013/0116895 | A1 * | 5/2013 | Smith | A01F 15/08 701/50 |
| 2019/0315345 | A1 * | 10/2019 | Newman | B60W 50/14 |

* cited by examiner

*Primary Examiner* — Phung Nguyen
(74) *Attorney, Agent, or Firm* — Harrity & Harrity LLP

(57) ABSTRACT

An electronic control unit (ECU) is disclosed. The ECU may receive a command associated with a vehicle. The ECU may actuate one or more lights on the vehicle in a first mode based on receiving the command. The ECU may transmit, while actuating the one or more lights in the first mode, the command to a vehicle controller associated with the vehicle. The ECU may actuate the one or more lights in a second mode based on receiving an acknowledgement of the command from the vehicle controller.

20 Claims, 5 Drawing Sheets

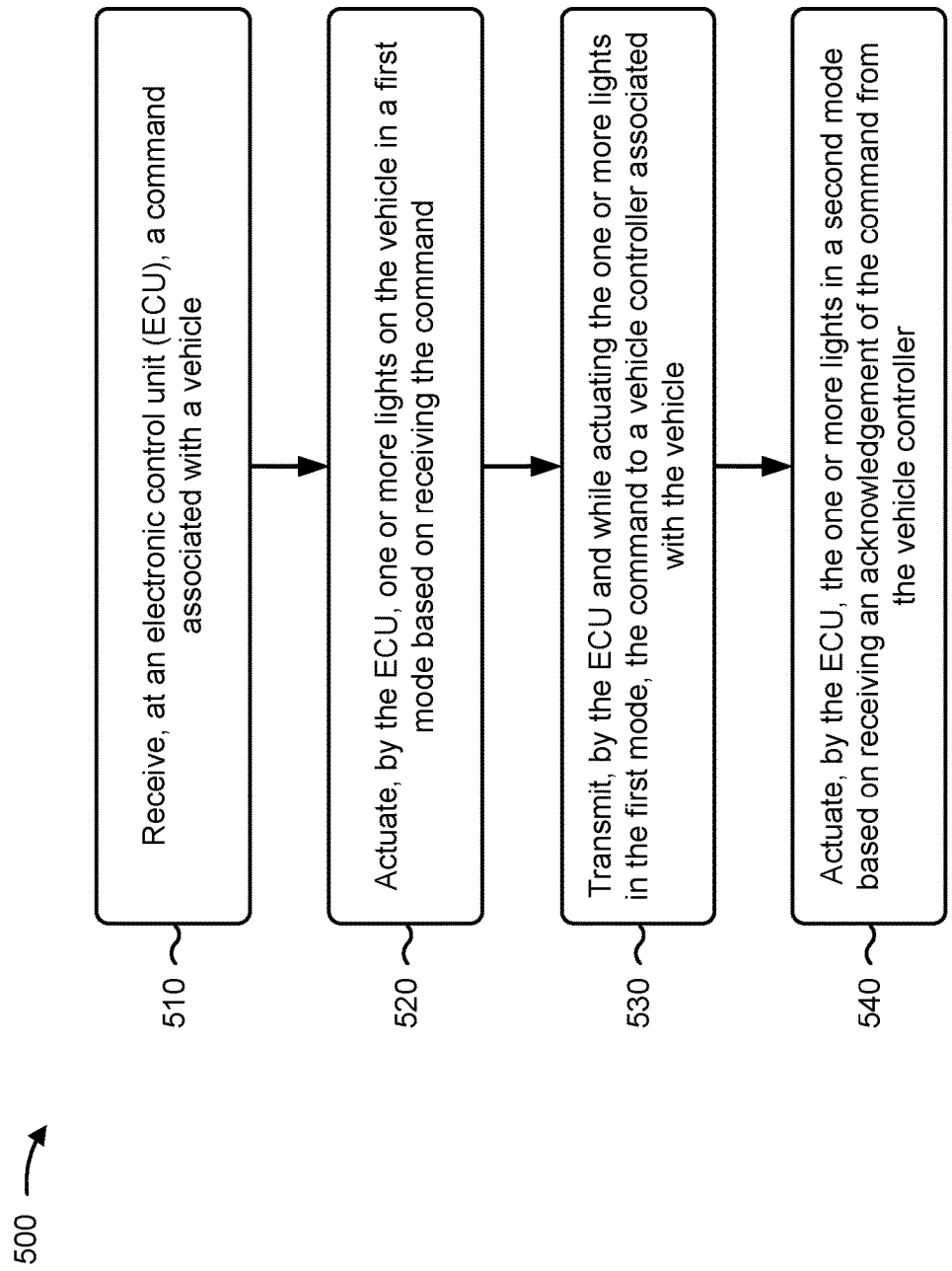

US 10,766,411 B1

COLLISION AVOIDANCE ACTIVATION LIGHTS

TECHNICAL FIELD

The present disclosure relates generally to collision avoidance and/or proximity detection and, more particularly, to collision avoidance activation lights.

BACKGROUND

A collision avoidance system (CAS), proximity detection system (PDS), collision avoidance and awareness system (CAAS), and/or the like of a vehicle may use information from one or more sensors to provide commands to a vehicle system of the vehicle. The vehicle system may carry out the commands to prevent or reduce the severity of collisions associated with the vehicle. In some cases, the CAS and/or vehicle system of the vehicle may provide, to an operator of the vehicle, one or more indications (e.g., on a dash of the vehicle, on a display in a cab of the vehicle, and/or the like) pertaining to the status of the CAS and/or vehicle controller carrying out the commands. While the indications appraise the operator of the vehicle as to the status of the CAS and/or vehicle controller carrying out the commands, personnel external to the vehicle and/or operators of other vehicles are not made aware that the CAS has issued a command to the vehicle controller and/or whether the vehicle controller has acknowledged the command. This can lead to unsafe conditions for the operator of the vehicle, personnel external to the vehicle, and/or operators of other vehicles, which can lead to catastrophic events such as a vehicle crash, damaged property, and/or loss of life.

One approach to a collision warning system is disclosed in U.S. Pat. No. 10,059,261 that issued to Wu on Aug. 28, 2018. In particular, the '261 patent discloses that if a processor 24 detects a hazard 12, the processor 24 executes instructions to activate an internal warning signal system 28 and/or an external warning signal system 30.

While the internal and external warning signal systems of the '261 patent include one or more warning devices capable of providing a warning signal to vehicle occupants and nearby traffic, the '231 patent does not address the issue of providing indications to personnel external to a vehicle and/or operators of other vehicles such that the personnel external to a vehicle and/or operators of other vehicles are aware that a CAS associated with the vehicle has issued a command to a vehicle controller associated with the vehicle and/or are aware of whether the vehicle controller has acknowledged the command.

The systems and/or devices of the present disclosure solve one or more of the problems set forth above and/or other problems in the art.

SUMMARY

According to some implementations, the present disclosure is related to a method that includes receiving a command associated with a vehicle; actuating one or more lights on the vehicle in a first mode based on receiving the command; transmitting, while actuating the one or more lights in the first mode, the command to a vehicle controller associated with the vehicle; and actuating the one or more lights in a second mode based on receiving an acknowledgement of the command from the vehicle controller.

According to some implementations, the present disclosure is related to a system that includes one or more lights on a vehicle and an electronic control unit (ECU), associated with the vehicle, to actuate the one or more lights on the vehicle in a first mode based on at least one of receiving a command associated with the vehicle or detecting an error associated with the vehicle; transmit, to a vehicle controller associated with the vehicle and while actuating the one or more lights in the first mode, at least one of the command associated with the vehicle or an indication of the error associated with the vehicle; and actuate the one or more lights in a second mode based on receiving, from the vehicle controller, an acknowledgement of at least one of the command associated with the vehicle or the indication of the error associated with the vehicle.

According to some implementations, the present disclosure is related to an ECU that includes one or more memories and one or more processors communicatively coupled to the one or more memories, to receive, from a collision avoidance system (CAS) controller, a command associated with a CAS of a vehicle; actuate, based on receiving the command, one or more lights on the vehicle in a first mode; transmit, while actuating the one or more lights in the first mode, the command to a vehicle controller associated with the vehicle; and actuate, based on receiving an acknowledgement of the command from the vehicle controller, the one or more lights in a second mode.

BRIEF DESCRIPTION OF THE DRAWINGS

FIG. 5 is a flow chart of an example process for collision avoidance activation lights.

DETAILED DESCRIPTION

This disclosure relates to techniques for actuating collision avoidance activation lights. The techniques for actuating collision avoidance activation lights have universal applicability to any machine utilizing collision avoidance systems (CASs), proximity detection systems (PDSs), collision avoidance and awareness systems (CAASs), and/or the like. The term "machine" as used herein may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a material handler, a motor grader, a pipelayer, a road reclaimer, a skid steer loader, a skidder, a telehandler, a tractor, a dozer, a tractor scraper, or other above ground equipment and/or underground equipment.

Figure 1:
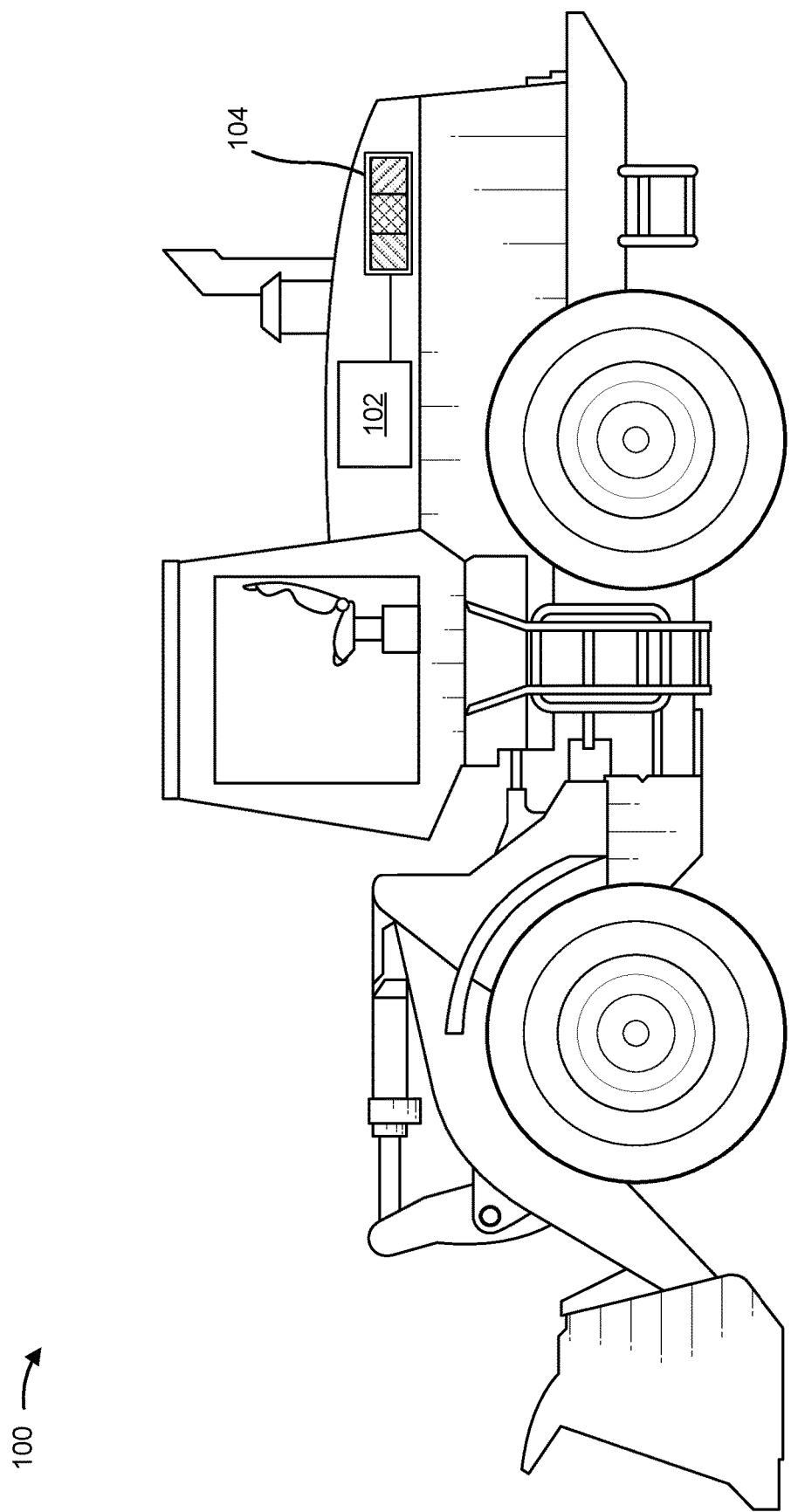
FIG. 1 is diagram of an example vehicle described herein.

FIG. 1 is a diagram of an example vehicle 100 described herein. As shown in FIG. 1, vehicle 100 may include an electronic control unit (ECU) 102 and one or more lights 104 (collectively referred to as "lights 104" and individually as "light 104"). ECU 102 and lights 104 may be included in a vehicle system associated with vehicle 100. The vehicle system may control one or more aspects of the operation of vehicle 100. For example, the vehicle system may control steering, braking, accelerating, and/or the like.

The vehicle system may communicate with a CAS (or PDS, CAAS, and/or the like) associated with vehicle 100. In this case, ECU 102 may function as an interface between the vehicle system and the CAS. For example, ECU 102 may receive a command from the CAS (e.g., a collision avoidance command), may transmit the command to one or more devices included in the vehicle system, and may receive an acknowledgement from the one or more devices. An acknowledgement may indicate that a device has received the command and is acting upon the command (e.g., by performing one or more actions associated with the command).

ECU 102 may actuate lights 104 based on receiving a command from the CAS, based on receiving an acknowledgement of a command from a device included in the vehicle system, and/or the like. In some implementations, ECU 102 may actuate lights 104 based on detecting an error (e.g., associated with the CAS, associated with the vehicle system, and/or the like), based on receiving an acknowledgement of the error from a device included in the CAS and/or the vehicle system, and/or the like.

Lights 104 may include one or more lights mounted and/or installed on the exterior of vehicle 100 and/or mounted and/or installed in a manner such that lights 104 are visible to personnel external to vehicle 100. For example, lights 104 may be mounted and/or installed on one or more sides of vehicle 100 (e.g., a front side, a rear side, a left side, a right side, and/or the like), may be mounted and/or installed on a top of vehicle 100, may be mounted and/or installed on an undercarriage or underframe of vehicle 100, may be mounted and/or installed on one or more wheels or treads of vehicle 100, may be mounted on a cab of vehicle 100, and/or the like. In this way, various types of actuation of lights 104 may indicate, to the external personnel (e.g., pedestrians near vehicle 100, personnel working near vehicle 100, personnel operating other vehicles near vehicle 100, and/or the like), that a command has been issued by the CAS associated with vehicle 100, whether the command has been acknowledged by the vehicle system associated with vehicle 100, that an error associated with the CAS and/or vehicle system has occurred, whether the error has been acknowledged by the vehicle system and/or CAS, and/or the like.

As indicated above, FIG. 1 is provided as an example. Other examples may differ from what was described in connection with FIG. 1.

Figure 2:
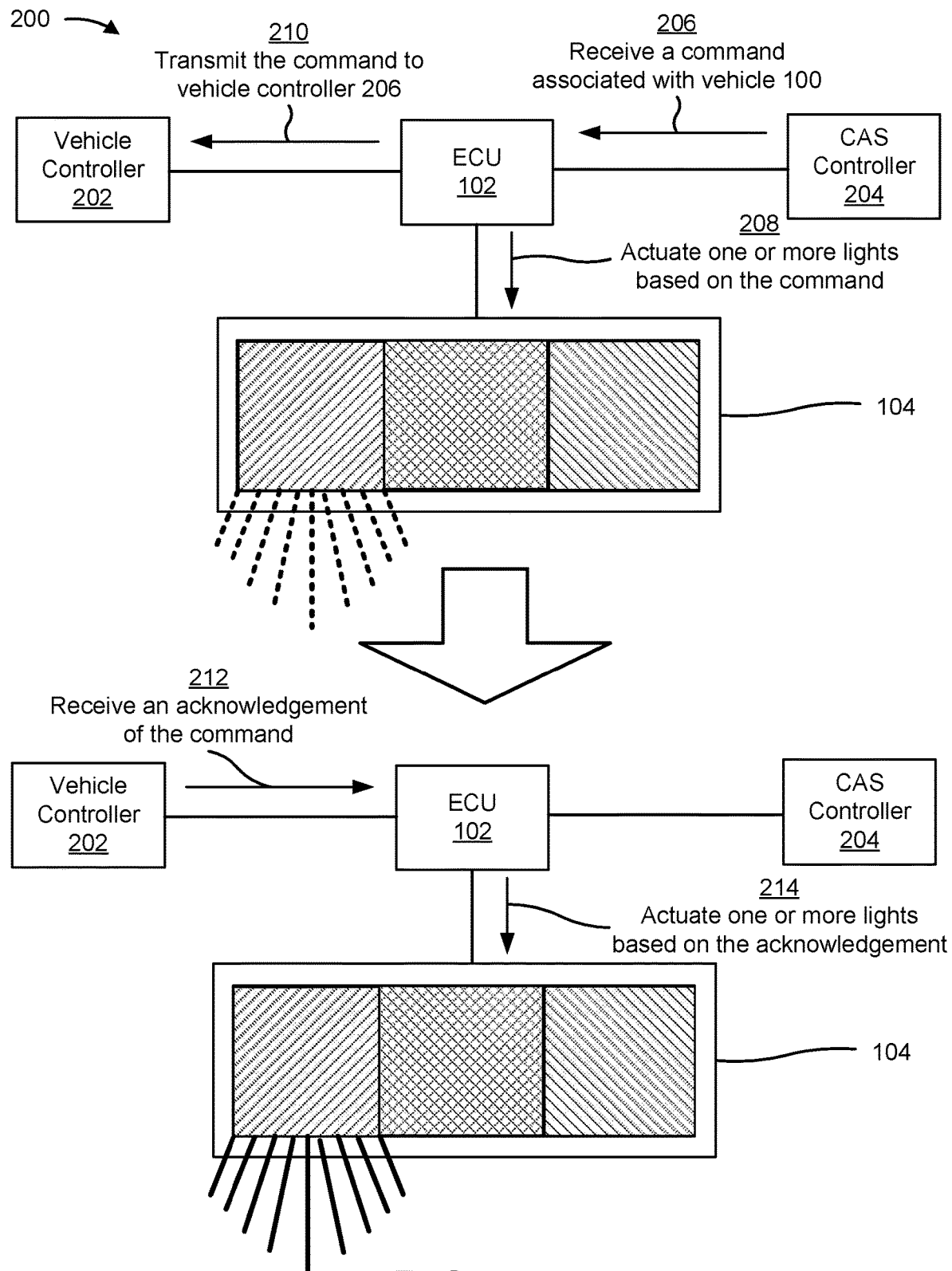
FIGS. 2 and 3 are diagrams of example implementations described herein.

FIG. 2 is a diagram of an example implementation 200 described herein. Example implementation 200 may illustrate one or more examples of collision avoidance activation lights. As shown in FIG. 2, example implementation 200 may include an ECU (e.g., ECU 102), one or more lights (e.g., lights 104), a vehicle controller (e.g., vehicle controller 202), and a CAS controller (e.g., CAS controller 204) associated with a vehicle (e.g., vehicle 100).

Vehicle controller 202 may include an ECU, an electronic control module (ECM), and/or another type of device that is capable of controlling one or more aspects of the operation of vehicle 100 (e.g., steering, braking, accelerating, and/or the like). Vehicle controller 202 may be included in a vehicle system, along with ECU 102 and lights 104, associated with vehicle 100.

CAS controller 204 may include an ECU, an ECM, and/or another type of device, included in a CAS associated with vehicle 100, that is capable of receiving information from one or more sensors included in the CAS and generating one or more commands based on the information. CAS controller 204 may provide the one or more commands to ECU 102, which may function as an interface between vehicle controller 202 and CAS controller 204.

As shown in FIG. 2, and by reference number 206, ECU 102 may receive, from CAS controller 204, a command associated with vehicle 100 (e.g., associated with the CAS associated with vehicle 100, associated with the vehicle system associated with vehicle 100, and/or the like). Examples of commands may include an emergency stop command (e.g., a command to quickly stop vehicle 100 so as to avoid an imminent collision and/or another type of unsafe scenario), a slowdown command (e.g., a command to reduce the speed of travel of vehicle 100), a motion inhibit command (e.g., a command to prevent vehicle 100 from moving from a current position and/or location), a controlled stop command (e.g., a command to cause vehicle 100 to come to a gradual and longer stop relative to an emergency stop), an override command (e.g., a command, based on CAS controller 204 detecting an override switch of the vehicle being engaged, to permit vehicle controller 202 to temporarily override the CAS), and/or the like.

As further shown in FIG. 2, and by reference number 208, ECU 102 may actuate one or more lights of lights 104 based on the command. For example, ECU 102 may actuate one or more lights of lights 104 in a first mode that is associated with receiving the command. The first mode may include actuating a particular colored light (e.g., red, yellow, green, or the like) of lights 104, actuating a particular combination of colored lights of lights 104, may actuate a particular color light in a particular flashing sequence and/or a particular time duration, may actuate a particular combination of colored lights in a particular flashing sequence and/or a particular time duration, and/or the like.

A flashing sequence may include a particular type of flashing of one or more lights (e.g., slow pulsing of the one or more lights, fast flashing of the one or more lights), a fixed periodic flashing of the one or more lights (e.g., the one or more lights are flashed at a fixed frequency), a variable flashing of the one or more lights (e.g., the one or more lights are flashed at differencing frequencies), and/or the like. A flashing sequence may include flashing a plurality of different colored lights (e.g., a red light and a yellow light, a red light and a green light, and/or the like) at the same frequency, using the same type of flashing, and/or the like. A flashing sequence may include flashing different colored lights in a sequential manner (e.g., flashing a red light first, flashing a yellow light after flashing the red light, flashing a green light after flashing the yellow light, and so on).

The reception of each type of command received from CAS controller 204 may be associated with a respective (e.g., different) type of actuation of one or more lights of lights 104. As an example, the reception of an emergency stop command may be associated with illuminating a red light, of lights 104, in a flashing sequence. As another example, a slowdown command may be associated with illuminating a yellow light, of lights 104, in a flashing sequence. As another example, a motion inhibit command may be associated with illuminating a green light, of lights 104, in a flashing sequence. As another example, a controlled stop command may be associated with illuminating a red light and a yellow light, of lights 104, in a flashing sequence. As another example, an override command may be associated with illuminating a red light, a yellow light, and a green light, of lights 104, in a solid mode (e.g., such that the red light, the yellow light, and the green light are illuminated and not flashing). The respective flashing sequences, associated with different types of commands, may be the same flashing sequence or different flashing sequences.

As further shown in FIG. 2, and by reference number 210, ECU 102 may transmit the command, received from CAS controller 204, to vehicle controller 202. ECU 102 may transmit the command while ECU 102 is actuating the one or more lights, of lights 104, based on receiving the command from CAS controller 204.

Vehicle controller 202 may receive the command from ECU 102 and may perform one or more actions in order to carry out the command. For example, if the command is an emergency stop command, vehicle controller 202 may engage one or more brakes of vehicle 100 (e.g., front brakes, rear brakes, emergency brakes, and/or the like) in order to perform an emergency stop of vehicle 100. As another example, if the command is a slowdown command, vehicle controller 202 may engage one or more brakes of vehicle 100 (e.g., front brakes, rear brakes, an automatic brake retarder, and/or the like) in order to reduce a speed of travel of vehicle 100. As another example, if the command is a motion inhibit command, vehicle controller 202 may engage one or more brakes of vehicle 100 (e.g., front brakes, rear brakes, and/or the like), may disengage and/or prevent a transmission of vehicle 100 from engaging a drivetrain of vehicle 100, and/or the like in order to prevent vehicle 100 from moving. As another example, if the command is a controlled stop command, vehicle controller 202 may engage one or more brakes of vehicle 100 (e.g., front brakes, rear brakes, an automatic brake retarder, and/or the like) in order to gradually and/or steadily cause vehicle 100 to come to a stop. As another example, if the command is an override command, vehicle controller 202 may ignore and/or override one or more other commands of CAS controller 204 for a particular time period.

As further shown in FIG. 2, and by reference number 212, ECU 102 may receive an acknowledgement of the command from vehicle controller 202. Vehicle controller 202 may transmit the acknowledgement based on receiving the command and initiating the one or more actions to carry out the command. The acknowledgement may include a signal, a communication, an electrical input such as a particular voltage, current, inductance, impedance, resistance, and/or the like.

As further shown in FIG. 2, and by reference number 214, ECU 102 may actuate one or more lights of lights 104 based on the acknowledgement. For example, ECU 102 may actuate one or more lights of lights 104 in a second mode (e.g., a mode that is different from the first mode) that is associated with receiving an acknowledgement associated with a particular command. The actuation of the one or more lights in the second mode may indicate, to personnel external to vehicle 100, that vehicle controller 202 has received a particular type of command from CAS controller 204 and is in the process of performing one or more actions to carry out the command.

As indicated above, the second mode of actuation may be based on the type of command associated with the acknowledgement, and may be based on reception of the acknowledgement from vehicle controller 202 (e.g., as opposed to being based on reception of the command from CAS controller 204, such as may occur with the first mode). The second mode may include actuating a particular colored light (e.g., red, yellow, green, or the like) of lights 104, actuating a particular combination of colored lights of lights 104, actuating a particular color light in a particular flashing sequence and/or a particular time duration, actuating a particular combination of colored lights in a particular flashing sequence and/or a particular time duration, and/or the like. The particular flashing sequence may include any of the examples of flashing sequences described above and/or other flashing sequences.

The reception of an acknowledgement of each type of command may be associated with a respective (e.g., different) type of actuation of one or more lights of lights 104. As an example, the reception of an acknowledgement associated with an emergency stop command may be associated with illuminating a red light, of lights 104, in a solid mode. As another example, the reception of an acknowledgement associated with a slowdown command may be associated with illuminating a yellow light, of lights 104, in a solid mode. As another example, the reception of an acknowledgement associated with a motion inhibit command may be associated with illuminating a green light, of lights 104, in a solid mode. As another example, the reception of an acknowledgement associated with a controlled stop command may be associated with illuminating a red light and a yellow light, of lights 104, in a solid mode. As another example, the reception of an acknowledgement associated with an override command may be associated with turning off a red light, a yellow light, and a green light, of lights 104, that were illuminated during a time period associated with the override command. In this case, vehicle controller 202 may transmit the acknowledgement after expiration of the time period.

As indicated above, FIG. 2 is provided as an example. Other examples may differ from what was described in connection with FIG. 2. For example, while example implementation 200 is described above in reference to actuating lights 104 to indicate the status of a command being issued by CAS controller 204 and carried out by vehicle controller 202, other forms of indications may be used. As an example, ECU 102 may cause one or more speakers (e.g., included on vehicle 100 and/or remote to vehicle 100) to play an audible tone, a recorded message, and/or the like, associated with particular types of commands and/or acknowledgements associated with particular types of commands.

Figure 3:
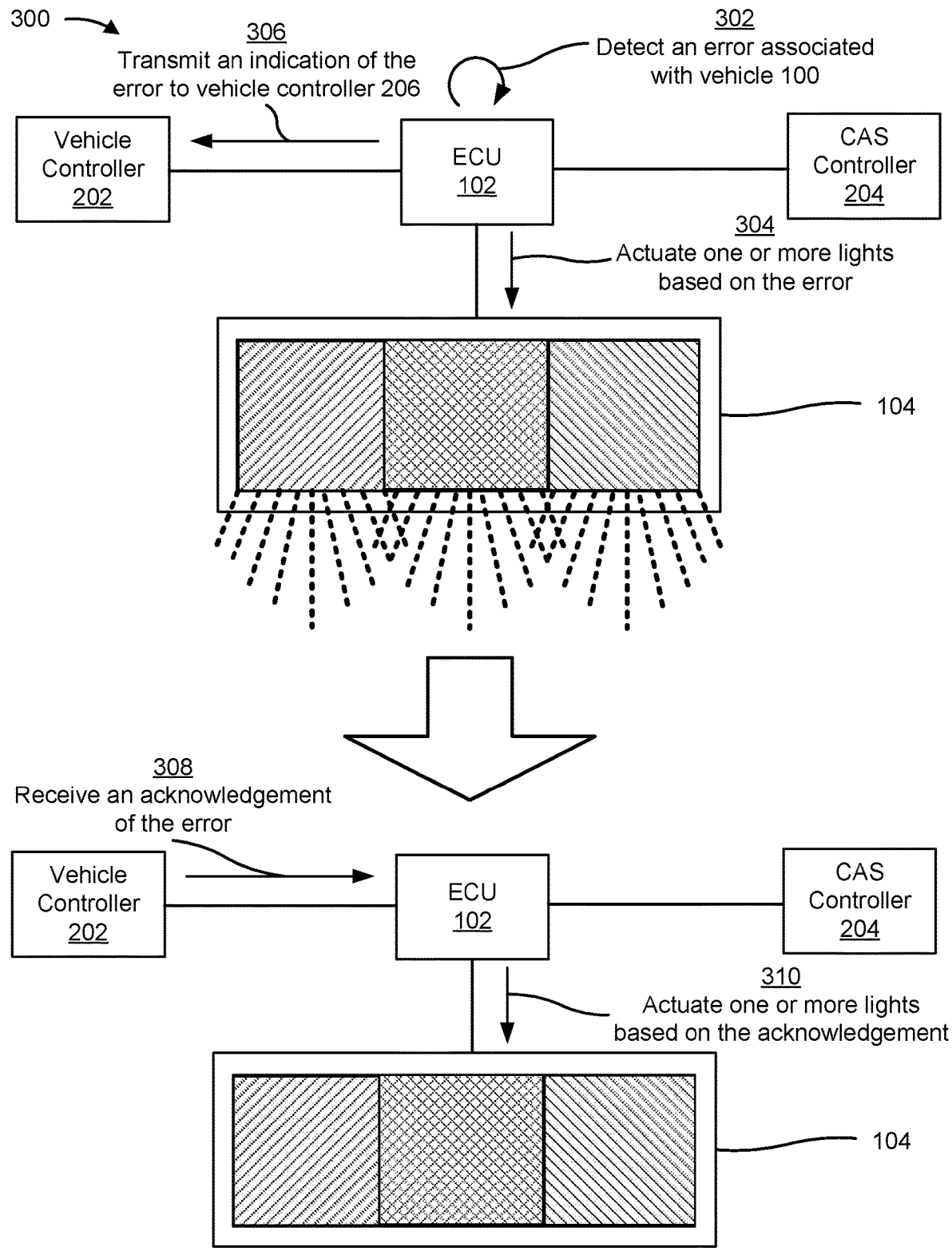

FIG. 3 is a diagram of an example implementation 300 described herein. Example implementation 300 may illustrate one or more examples of collision avoidance activation lights. As shown in FIG. 3, example implementation 300 may include an ECU (e.g., ECU 102), one or more lights (e.g., lights 104), a vehicle controller (e.g., vehicle controller 202), and a CAS controller (e.g., CAS controller 204) associated with a vehicle (e.g., vehicle 100).

As shown in FIG. 3, and by reference number 302, ECU 102 may detect an error associated with vehicle 100. The error may be associated with the vehicle system associated with vehicle 100, may be associated with the CAS associated with vehicle 100, may be associated with another system and/or device associated with vehicle 100, and/or the like. Examples of errors may include a system startup error associated with the vehicle system and/or the CAS, a failed handshake between vehicle controller 202 and ECU 102, a failed handshake between CAS controller 204 and ECU 102, an improper command use by CAS controller 204 (e.g., transmitting an emergency stop command when vehicle 100 is not in motion), and/or the like.

As further shown in FIG. 3, and by reference number 304, ECU 102 may actuate one or more lights of lights 104 based on detecting the error. For example, ECU 102 may actuate one or more lights, of lights 104, in a first mode that is associated with the error and/or detecting the error. The first mode may include actuating a particular colored light (e.g., red, yellow, green, or the like) of lights 104, actuating a particular combination of colored lights of lights 104, actuating a particular color light in a particular flashing sequence and/or a particular time duration, actuating a particular combination of colored lights in a particular flashing sequence and/or a particular time duration, and/or the like. As an example, ECU 102 may illuminate a red light, a yellow light, and a green light, of lights 104, in a particular flashing sequence based on detecting the error. The particular flashing sequence may include any of the examples of flashing sequences described above and/or other flashing sequences.

As further shown in FIG. 3, and by reference number 306, ECU 102 may transmit an indication of the error to vehicle controller 202. ECU 102 may transmit the indication of the error while ECU 102 is actuating the one or more lights, of lights 104, in the first mode based on detecting the error.

Vehicle controller 202 may receive the indication of the error from ECU 102 and may perform one or more actions in order to mitigate and/or resolve the error. For example, vehicle controller 202 may transmit a reset command to one or more devices included in the vehicle system, may transmit a reset command to one or more devices included in the CAS, may perform a reset of vehicle controller 202, and/or the like.

As further shown in FIG. 3, and by reference number 308, ECU 102 may receive an acknowledgement of the indication of the error from vehicle controller 202. Vehicle controller 202 may transmit the acknowledgement based on receiving the indication of the error and initiating the one or more actions to mitigate and/or resolve the error. The acknowledgement may include a signal, a communication, an electrical input such as a particular voltage, current, inductance, impedance, resistance, and/or the like.

As further shown in FIG. 3, and by reference number 310, ECU 102 may actuate one or more lights of lights 104 based on the acknowledgement. For example, ECU 102 may actuate one or more lights of lights 104 in a second mode (e.g., a mode that is different from the first mode) that is associated with receiving an acknowledgement associated with an error, that is associated with receiving an acknowledgement that is associated with a particular type of error, and/or the like. The actuation of the one or more lights in the second mode may indicate, to personnel external to vehicle 100, that ECU 102 has detected the error and that vehicle controller 202 is in the process of performing one or more actions to mitigate and/or resolve the error.

The second mode may include actuating a particular colored light (e.g., red, yellow, green, or the like) of lights 104, actuating a particular combination of colored lights of lights 104, actuating a particular color light in a particular flashing sequence and/or a particular time duration, actuating a particular combination of colored lights in a particular flashing sequence and/or a particular time duration, and/or the like. The particular flashing sequence may include any of the examples of flashing sequences described above and/or other flashing sequences. In some implementations, the second mode may include turning off any lights, of lights 104, that were illuminated based on detecting the error.

As indicated above, FIG. 3 is provided as an example. Other examples may differ from what was described in connection with FIG. 3. For example, while example implementation 300 is described above in reference to actuating lights 104 to indicate the status of an error being detected by ECU 102 and mitigated or resolved by vehicle controller 202, other forms of indications may be used. As an example, ECU 102 may cause one or more speakers (e.g., included on vehicle 100 and/or remote to vehicle 100) to play an audible tone, a recorded message, and/or the like, associated with particular types of errors and/or acknowledgements associated with particular types of errors.

Figure 4:
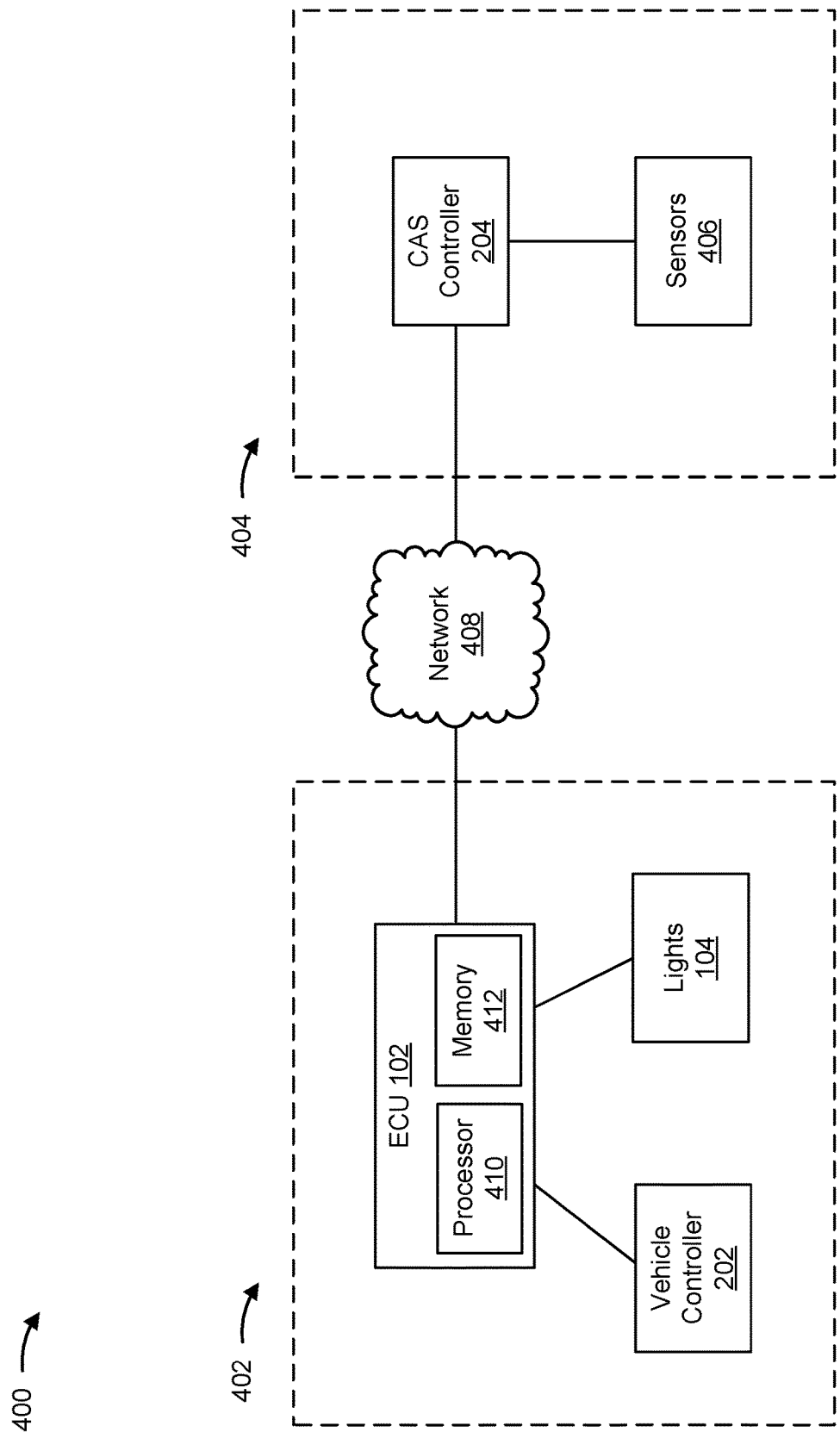
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a vehicle system 402 and a CAS 404. Vehicle system 402 and CAS 404 may be associated with, and/or included in, a vehicle (e.g., vehicle 100). Vehicle system 402 may include one or more devices, such as ECU 102, lights 104, and vehicle controller 202. CAS 404 may include one or more devices, such as CAS controller 204 and one or more sensors 406 (collectively referred to as "sensors 406" and individually as "sensor 406"). The one or more devices of vehicle system 402 and CAS 404 may be interconnected via a network 408. The connections may include wired connections, wireless connections, or a combination of wired and wireless connections.

ECU 102 may include one or more devices or components configured to function as an interface between vehicle system 402 and CAS 404. For example, ECU 102 may include an ECU, an ECM, an interface ECM, a proximity detection interface module (PDIM) device, and/or the like, that may receive a command from CAS controller 204, may actuate one or more lights, of lights 104, in a first mode based on receiving the command, may transmit, while actuating the one or more lights in the first mode, the command to vehicle controller 202, may actuate the one or more lights in a second mode based on receiving an acknowledgement of the command from vehicle controller 202, and/or the like. In some implementations, ECU 102 may detect an error associated with a vehicle (e.g., vehicle 100), may actuate one or more lights, of lights 104, in a first mode based on detecting the error, may transmit, while actuating the one or more lights in the first mode, an indication of the error to vehicle controller 202, may actuate the one or more lights in a second mode based on receiving an acknowledgement of the indication of the error from vehicle controller 202, and/or the like.

ECU 102 may include processor 410, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Processor 410 may implemented in hardware, firmware, and/or a combination of hardware and software. ECU 102 may include one or more processors capable of being programmed to perform a function. One or more memories, including a random-access memory (RAM), a read only memory (ROM), and/or another type of dynamic or static storage device (e.g., a flash memory, a magnetic memory, and/or an optical memory) may store information and/or instructions for use by ECU 102. ECU 102 may include a memory 412 (or one or more memories) (e.g., a non-transitory computer-readable medium) capable of storing instructions that, when executed, cause processor 410 to perform one or more processes and/or methods described herein.

Lights 104 may include various types of lights, such as incandescent lights, halogen lights, light emitting diode (LED) lights, high intensity discharge (HID) lights, and/or the like. Lights 104 may include individual or discrete lights and/or an array of integrated lights. Moreover, lights 104 may include differently colored lights (e.g., red lights, yellow lights, orange lights, green lights, blue lights, and/or the like), differently shaped lights, differently sized lights, and/or the like. Lights 104 may be located on an exterior of the vehicle. Each type of light may be located on one or more sides of the vehicle, on a top of the vehicle, on a bottom (e.g., undercarriage or underframe) of the vehicle, on a cab of the vehicle, and/or the like.

Vehicle controller 202 includes one or more devices capable of receiving commands and/or indications of errors associated with vehicle system 402, CAS 404, and/or other devices included in the vehicle, performing one or more actions based on commands and/or errors, transmitting acknowledgements associated with the commands and/or errors to ECU 102, and/or the like. Vehicle controller 202 may include a processor, such as a CPU, a GPU, an APU, a microprocessor, a microcontroller, a DSP, an FPGA, an ASIC, or another type of processing component. The processor may be implemented in hardware, firmware, and/or a combination of hardware and software. Vehicle controller 202 may include one or more processors capable of being programmed to perform a function. One or more memories, including a RAM, a ROM, and/or another type of dynamic or static storage device (e.g., a flash memory, a magnetic memory, and/or an optical memory) may store information and/or instructions for use by vehicle controller 202. Vehicle controller 202 may include a memory (or one or more memories) (e.g., a non-transitory computer-readable medium) capable of storing instructions that, when executed, cause the processor to perform one or more processes and/or methods described herein.

CAS controller 204 includes one or more devices capable of receiving information from sensors 406, generating commands based on the information, transmitting the commands to ECU 102, performing one or more actions based on errors associated with CAS 404, receiving (e.g., via a vehicle-to-everything (V2X) communication interface and/or another type of communication interface) override commands from other devices included in the vehicle, and/or the like. CAS controller 204 may include a processor, such as a CPU, a GPU, an APU, a microprocessor, a microcontroller, a DSP, an FPGA, an ASIC, or another type of processing component. The processor may be implemented in hardware, firmware, and/or a combination of hardware and software. CAS controller 204 may include one or more processors capable of being programmed to perform a function. One or more memories, including a RAM, a ROM, and/or another type of dynamic or static storage device (e.g., a flash memory, a magnetic memory, and/or an optical memory) may store information and/or instructions for use by CAS controller 204. CAS controller 204 may include a memory (or one or more memories) (e.g., a non-transitory computer-readable medium) capable of storing instructions that, when executed, cause the processor to perform one or more processes and/or methods described herein.

Sensors 406 include one or more sensors that can sense and/or generate information associated with collision avoidance and/or proximity detection for the vehicle. For example, sensors 406 may include one or more proximity sensors, one or more lidar sensors, one or more radar sensors, one or more cameras, one or more global navigation satellite system (GNSS) receivers, and/or the like.

Network 408 includes one or more wired and/or wireless electrical networks. For example, network 408 may include a sensor network, a controller area network (CAN), an Ethernet-based network, a cellular network, a Wi-Fi network, a Bluetooth network, an ISO 21815-2 compliant network, and/or the like.

The number and arrangement of devices and networks shown in FIG. 4 are provided as an example. In practice, there may be additional devices, fewer devices, different devices, or differently arranged devices than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

FIG. 5 is a flow chart of an example process 500 for collision avoidance activation lights. In some implementations, one or more process blocks of FIG. 5 may be performed by an ECU (e.g., ECU 102). In some implementations, one or more process blocks of FIG. 5 may be performed by another device or a group of devices separate from or including the ECU, such as one or more lights (e.g., lights 104), a vehicle controller (e.g., vehicle controller 202), a CAS controller (e.g., CAS controller 204), one or more sensors (e.g., sensors 406), and/or the like.

As shown in FIG. 5, process 500 may include receiving a command associated with a vehicle (block 510). For example, the ECU (e.g., using processor 410, memory 412, and/or the like) may receive a command associated with a vehicle, as described above. The command may include various types of commands associated with a CAS and/or PDS associated with the vehicle, such as an emergency stop command, a slowdown command, a motion inhibit command, a controlled stop command, an override command, and/or the like.

As further shown in FIG. 5, process 500 may include actuating one or more lights on the vehicle in a first mode based on receiving the command (block 520). For example, the ECU (e.g., using processor 410, memory 412, and/or the like) may actuate one or more lights on the vehicle in a first mode based on receiving the command, as described above. The ECU may actuate the one or more lights in the first mode by causing the one or more lights to illuminate in a flashing sequence (e.g., in a particular sequence associated with the command, for a particular time duration associated with the command, and/or the like), by causing the one or more lights to illuminate in a solid mode (e.g., such that the one or more lights are illuminated and not flashing), and/or the like.

As further shown in FIG. 5, process 500 may include transmitting, while actuating the one or more lights in the first mode, the command to a vehicle controller associated with the vehicle (block 530). For example, the ECU (e.g., using processor 410, memory 412, and/or the like) may transmit, while actuating the one or more lights in the first mode, the command to a vehicle controller associated with the vehicle, as described above.

As further shown in FIG. 5, process 500 may include actuating the one or more lights in a second mode based on receiving an acknowledgement of the command from the vehicle controller (block 540). For example, the ECU (e.g., using processor 410, memory 412, and/or the like) may actuate the one or more lights in a second mode based on receiving an acknowledgement of the command from the vehicle controller, as described above. The ECU may actuate the one or more lights in the second mode by causing the one or more lights to illuminate in a flashing sequence that is different from a flashing sequence of the first mode (e.g., in a particular sequence associated with the command, for a particular time duration associated with the command, and/or the like), by causing the one or more lights to illuminate in a solid mode (e.g., such that the one or more lights are illuminated and not flashing), by causing the one or more lights to turn off, and/or the like.

Process 500 may include additional implementations, such as any single implementation or any combination of implementations described below and/or in connection with one or more other processes described elsewhere herein.

In some implementations, the ECU may actuate one or more first lights in a first mode based on receiving the command and may actuate one or more second lights (e.g., which may be different from the one or more first lights) in the first mode or in a second mode based on receiving the acknowledgement of the command. In some implementations, the ECU may actuate the one or more lights in the first mode based on detecting an error associated with the vehicle (e.g., an error associated with the vehicle system associated with the vehicle, an error associated with the CAS and/or PDS associated with the vehicle, and/or the like), may transmit an indication of the error to the vehicle controller, and may actuate the one or more lights in the second mode based on receiving an acknowledgement of the indication of the error.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

The disclosed electronic control unit (ECU) (e.g., ECU 102) may be used in any vehicle system (e.g., vehicle system 402) that interfaces with a collision avoidance system and/or proximity detection system (e.g., CAS 404). The ECU may actuate one or more lights (e.g., lights 104) on a vehicle (e.g., vehicle 100) in a first mode based on a command or error associated with the vehicle. The ECU may transmit the command or indication of the error to a vehicle controller included in the vehicle system (e.g., vehicle controller 202), and may actuate the one or more lights in a second mode based on receiving, from the vehicle controller, an acknowledgement of the command or error. In this way, the actuations of the one or more lights may indicate the status of the collision avoidance system and/or vehicle system to personnel external to the vehicle and/or to operators of other vehicles. This permits the personnel external to the vehicle and/or the operators of other vehicles to operate safely and appropriately based on the status of the collision avoidance system and/or vehicle system of the vehicle, which can prevent catastrophic events such as a vehicle crash, damaged property, and/or loss of life.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A method, comprising:
   receiving, at an electronic control unit (ECU), a command associated with a vehicle;
   actuating, by the ECU, one or more lights on the vehicle in a first mode based on receiving the command;
   transmitting, by the ECU and while actuating the one or more lights in the first mode, the command to a vehicle controller associated with the vehicle; and
   actuating, by the ECU, the one or more lights in a second mode based on receiving an acknowledgement of the command from the vehicle controller.

2. The method of claim 1, wherein the command comprises:
   an emergency stop command;
   wherein actuating the one or more lights in the first mode comprises:
   illuminating a light, of the one or more lights, in a flashing sequence; and
   wherein actuating the one or more lights in the second mode comprises:
   illuminating the light in a solid mode.

3. The method of claim 1, wherein the command comprises:
   a slowdown command;
   wherein actuating the one or more lights in the first mode comprises:
   illuminating a light, of the one or more lights, in a flashing sequence; and
   wherein actuating the one or more lights in the second mode comprises:
   illuminating the light in a solid mode.

4. The method of claim 1, wherein the command comprises:
   a motion inhibit command;
   wherein actuating the one or more lights in the first mode comprises:
   illuminating a light, of the one or more lights, in a flashing sequence; and
   wherein actuating the one or more lights in the second mode comprises:
   illuminating the light in a solid mode.

5. The method of claim 1, wherein the command comprises:
   a controlled stop command;
   wherein actuating the one or more lights in the first mode comprises:
   illuminating a first light and a second light, of the one or more lights, in a flashing sequence; and
   wherein actuating the one or more lights in the second mode comprises:
   illuminating the first light and the second light in a solid mode,
   wherein the first light and the second light are different colored lights.

6. The method of claim 1, wherein the command comprises:
an override command;
wherein actuating the one or more lights in the first mode comprises:
illuminating a first light, a second light, and a third light, of the one or more lights, in a solid mode; and
wherein actuating the one or more lights in the second mode comprises:
turning off the first light, the second light, and the third light,
wherein the first light, the second light, and the third light are different colored lights.

7. The method of claim 1, wherein the one or more lights are located on one or more sides of the vehicle.

8. A system, comprising:
one or more lights on a vehicle; and
an electronic control unit (ECU), associated with the vehicle, to:
actuate the one or more lights on the vehicle in a first mode based on at least one of:
receiving a command associated with the vehicle, or
detecting an error associated with the vehicle;
transmit, to a vehicle controller associated with the vehicle and while actuating the one or more lights in the first mode, at least one of:
the command associated with the vehicle, or
an indication of the error associated with the vehicle; and
actuate the one or more lights in a second mode based on receiving, from the vehicle controller, an acknowledgement of at least one of:
the command associated with the vehicle, or
the indication of the error associated with the vehicle.

9. The system of claim 8, wherein the error associated with the vehicle comprises at least one of:
a system startup error associated with a collision avoidance system (CAS) of the vehicle,
a failed handshake between a CAS controller and the ECU, or
an improper command use by the CAS controller.

10. The system of claim 8, wherein the ECU, when actuating the one or more lights on the vehicle in the first mode, is to:
illuminate a first light, a second light, and a third light, of the one or more lights, in a flashing sequence based on detecting the error associated with the vehicle; and
wherein the ECU, when actuating the one or more lights in the second mode, is to:
turn off the first light, the second light, and the third light,
wherein the first light, the second light, and the third light are different colored lights.

11. The system of claim 8, wherein the ECU, when actuating the one or more lights on the vehicle in the first mode, is to:
illuminate a light, of the one or more lights, in a flashing sequence based on receiving the command associated with the vehicle,
wherein the command comprises:
an emergency stop command received from a collision avoidance system (CAS) controller of the vehicle; and
wherein the ECU, when actuating the one or more lights in the second mode, is to:
illuminate the light in a solid mode.

12. The system of claim 8, wherein the ECU, when actuating the one or more lights on the vehicle in the first mode, is to:
illuminate a light, of the one or more lights, in a flashing sequence based on receiving the command associated with the vehicle,
wherein the command comprises:
a slowdown command received from a collision avoidance system (CAS) controller of the vehicle; and
wherein the ECU, when actuating the one or more lights in the second mode, is to:
illuminate the light in a solid mode.

13. The system of claim 8, wherein the ECU, when actuating the one or more lights on the vehicle in the first mode, is to:
illuminate a first light, a second light, and a third light, of the one or more lights, in a solid mode based on receiving the command associated with the vehicle,
wherein the command comprises:
an override command received from an override switch of the vehicle; and
wherein the ECU, when actuating the one or more lights in the second mode, is to:
turn off the first light, the second light, and the third light,
wherein the first light, the second light, and the third light are different colored lights.

14. The system of claim 13, wherein the ECU is further to:
receive, from the vehicle controller, the acknowledgement of the override command after expiration of a time period from a time at which the ECU transmitted the override command to the vehicle controller.

15. An electronic control unit (ECU), comprising:
one or more memories; and
one or more processors, communicatively coupled to the one or more memories, to:
receive, from a collision avoidance system (CAS) controller, a command associated with a CAS of a vehicle;
actuate, based on receiving the command, one or more lights on the vehicle in a first mode;
transmit, while actuating the one or more lights in the first mode, the command to a vehicle controller associated with the vehicle; and
actuate, based on receiving an acknowledgement of the command from the vehicle controller, the one or more lights in a second mode.

16. The ECU of claim 15, wherein the command comprises:
an emergency stop command;
wherein the one or more processors, when actuating the one or more lights in the first mode, are to:
illuminate a red light, of the one or more lights, in a first flashing sequence; and
wherein the one or more processors, when actuating the one or more lights in the second mode, are to:
illuminate the red light in a second flashing sequence.

17. The ECU of claim 15, wherein the command comprises:
a slowdown command;
wherein the one or more processors, when actuating the one or more lights in the first mode, are to:
illuminate a light, of the one or more lights, in a first flashing sequence; and wherein the one or more processors, when actuating the one or more lights in the second mode, are to:
illuminate the light in a second flashing sequence.

18. The ECU of claim 15, wherein the command comprises:
a motion inhibit command;
wherein the one or more processors, when actuating the one or more lights in the first mode, are to:
illuminate a light, of the one or more lights, in a first flashing sequence; and
wherein the one or more processors, when actuating the one or more lights in the second mode, are to:
illuminate the light in a second flashing sequence.

19. The ECU of claim 15, wherein the command comprises:
a controlled stop command;
wherein the one or more processors, when actuating the one or more lights in the first mode, are to:
illuminate a first light and a second light, of the one or more lights, in a first flashing sequence; and
wherein the one or more processors, when actuating the one or more lights in the second mode, are to:
illuminate the first light and the second light in a second flashing sequence,
wherein the first light and the second light are different colored lights.

20. The ECU of claim 15, wherein the command comprises:
an override command;
wherein the one or more processors, when actuating the one or more lights in the first mode, are to:
illuminate a first light, a second light, and a third light, of the one or more lights, in a first flashing sequence; and
wherein the one or more processors, when actuating the one or more lights in the second mode, are to:
illuminate the first light, the second light, and the third light in a second flashing sequence,
wherein the first light, the second light, and the third light are different colored lights.

* * * * *